United States Patent
Nakayama et al.

(10) Patent No.: US 6,642,286 B2
(45) Date of Patent: Nov. 4, 2003

(54) RESIN COMPOSITION FOR SOFT RELINING MATERIAL

(75) Inventors: Mizuki Nakayama, Tokyo (JP); Tomohiro Kumagai, Tokyo (JP); Toshihiro Sekiguchi, Tokyo (JP)

(73) Assignee: GC Corporation, Tokyo (JP)

( * ) Notice: Subject to any disclaimer, the term of this patent is extended or adjusted under 35 U.S.C. 154(b) by 17 days.

(21) Appl. No.: 09/948,776

(22) Filed: Sep. 10, 2001

(65) Prior Publication Data

US 2002/0058727 A1 May 16, 2002

(30) Foreign Application Priority Data

Sep. 27, 2000 (JP) .......................................... 2000-293613

(51) Int. Cl.$^7$ ............................. A61K 6/083; C08K 5/11
(52) U.S. Cl. ....................... 523/120; 523/113; 523/116; 523/118; 524/321; 522/79
(58) Field of Search .................................. 523/120, 113, 523/116, 118; 524/731, 321; 522/79

(56) References Cited

U.S. PATENT DOCUMENTS

| | | | | |
|---|---|---|---|---|
| 4,493,911 A | * | 1/1985 | Schmitt et al. | .............. 523/109 |
| 4,782,100 A | * | 11/1988 | Iwamoto et al. | ............ 522/120 |
| 5,037,473 A | * | 8/1991 | Antonucci et al. | |
| 5,401,806 A | * | 3/1995 | Braden et al. | |

\* cited by examiner

*Primary Examiner*—Tae H. Yoon
(74) *Attorney, Agent, or Firm*—Oblon, Spivak, McClelland, Maier & Neustadt, P.C.

(57) ABSTRACT

There is provided a resin composition for soft relining material that can meet the performances required in a soft relining material for denture base, such as a proper softness and fitness between a denture base and an oral mucosa, without using a phthalate-based plasticizer widely used in the conventional art resin composition for soft relining material, which is pointed out to have a possibility for influencing living bodies as an endocrine disruptor. The soft resin composition for denture base is constructed of (a) a (meth)acrylate monomer having at least one unsaturated double bond; (b) an aliphatic acid ester-based plasticizer; (c) a (meth)acrylate polymer or copolymer; and (d) a polymerization initiator.

5 Claims, No Drawings

RESIN COMPOSITION FOR SOFT RELINING MATERIAL

BACKGROUND OF THE INVENTION

1. Field of the Invention

The present invention relates to a resin composition for soft relining material, that is used for improving the fitness of a denture, or for a mucosal conditioner that is temporarily used until diseases of a patient who mounts a denture, such as atrophy or inflammation in an oral mucosa, have been cured, in the dental remedy.

2. Description of the Conventional Art

In the dentistry, when a denture is used for a long period of time, the fitness between a denture base and an oral mucosa becomes worse due to absorption of an alveolar ridge and the like, whereby it becomes poor to maintain and stabilize the denture. In such case, it is generally attempted to recover the fitness between the denture base and the oral mucosa by a treatment in which one layer of the oral mucosa side of the denture base is eliminated, and a resin material for soft relining material is laminated thereon. This soft relining material is a relatively soft and functions to compensate a lost elasticity of an alvelar ridge mucosa and to impart cushioning properties, thereby lessening the impact during occlusion. As such soft relining materials, has been widely used a resin composition for denture base, which comprises a powder of a polymer such as polymethyl methacrylate and a liquid of a monomer such as methyl methacrylate, containing about 10 to 90% by weight of a phthalate-based plasticizer.

In addition, when the patient continues to use the denture in an unfit state, since a non-uniform force is continuously applied to the mucosa under the denture base, atrophy or inflammation occurs in the oral mucosa, resulting in a pain during the occlusion. In such case, relining must be carried out after the oral mucosa has become in a healthy state, or depending on the case, a new denture must be prepared. During this time, it is attempted to protect and recover the oral mucosa by laminating a soft material for denture base called a mucosal conditioner on the oral mucosa side of the denture base. As such mucosal conditioners, has been widely used a resin composition for soft relining material, which generally comprises a powder of a polymer such as polymethyl methacrylate and a liquid of a phthalate-based plasticizer containing about 8 to 20% by weight of ethanol.

As described above, the phthalate-based plasticizers are widely used as a component for softening a cured material in resin compositions for soft relining material, such as mucosal conditioners. However, in recent years, it has begun to be pointed out that the phthalate-based plasticizers may possibly influence living bodies as an endocrine disrupter, and the development of a resin composition for soft relining material is being proceeded to a direction that the use of substances possibly influencing living bodies be avoided as far as possible. For these reasons, it has been demanded to develop a soft resin composition for relining material such as a mucosal conditioner, using a substitute for the phthalates.

SUMMARY OF THE INVENTION

Thus, the present invention is aimed to provide a resin composition for soft relining material that can meet the performances required in the conventional art, such as a proper softness and fitness between a denture base and an oral mucosa, without using a phthalate-based plasticizer that has hitherto been widely used in the resin composition for soft relining material.

In order to achieve the above-described aim, we, the present inventors made extensive and intensive investigations. As a result, it has been found that an acid ester-based plasticizer has no possibility to influence living bodies as an endocrine disrupter; a resin composition for soft relining material comprising this acid ester-based plasticizer, a (meth)acrylate monomer having at least one unsaturated double bond, a polymerization initiator, and a (meth)acrylate polymer or copolymer, can give various performances same as those in the conventional art resin material for soft relining material; the above-described (meth)acrylate monomer having at least one unsaturated double bond is polymerized to fix the acid ester-based plasticizer and ethyl alcohol in the polymer, thereby preventing the elution of these materials; and the thus formulated resin material for soft relining material can impart an advantage such that it does not become hard with a lapse of time during the use, leading to accomplishment of the invention.

The term "acid ester" as used herein refers to an ester of an aliphatic acid.

Specifically, the present invention is concerned with a resin composition for soft relining material comprising (a) a (meth)acrylate monomer having at least one unsaturated double bond; (b) an acid ester-based plasticizer; (c) a (meth)acrylate polymer or copolymer; and (d) a polymerization initiator. In particular, the present invention is preferably concerned with a resin composition for soft relining material comprising 2 to 50% by weight of the (meth)acrylate monomer (a) having at least one unsaturated double bond; 20 to 80% by weight of the acid ester-based plasticizer (b); and 10 to 70% by weight of the (meth)acrylate polymer or copolymer (c); and 0.005 to 5 parts by weight based on 100 parts by weight of the total sum of the components (a), (b) and (c), of the polymerization initiator (d). If desired, the resin composition for soft relining material according to the present invention may further contain 1 to 15% by weight of (e) ethyl alcohol. Further, it is preferred that the acid ester-based plasticizer (b) is at least one plasticizer selected from the group consisting of trimellitic acid esters, fatty acid esters, acetic acid esters, maleic acid esters, fumaric acid esters, and citric acid esters.

DESCRIPTION OF THE PREFERRED EMBODIMENTS

The respective components of the resin composition for soft relining material according to the present invention will be described below in detail.

The (meth)acrylate monomer having at least one unsaturated double bond as the component (a) swells the (meth)acrylate polymer or copolymer as the component (c) to impart proper operability to the resin composition for soft relining material. Further, the (meth)acrylate monomer having at least one unsaturated double bond as the component (a) is polymerized by the polymerization initiator as the component (d), thereby functioning to prevent the acid ester-based plasticizer as the component (b) and ethyl alcohol as the component (e), which is compounded, if desired, in the composition from elution out of the composition after the polymerization.

As the (meth)acrylate monomer having at least one unsaturated double bond as the component (a), are usable general monomers that have hitherto been used in the dentistry. Specific examples include monomers of methyl (meth)

acrylate, ethyl (meth)acrylate, isopropyl (meth)acrylate, 2-hydroxyethyl (meth)acrylate, 3-hydroxypropyl (meth)acrylate, 2-hydroxy-1,3-dimethacryloxypropane, t-butyl (meth)acrylate, n-butyl (meth)acrylate, isobutyl (meth)acrylate, butoxyethyl (meth)acrylate, hydroxypropyl (meth)acrylate, tetrahydrofurfuryl (meth)acrylate, glycidyl (meth)acrylate, 2-methoxyethyl (meth)acrylate, 2-ethylhexyl (meth)acrylate, benzyl (meth)acrylate, ethylene glycol (meth)acrylate, diethylene glycol di(meth)acrylate, 1,3-butylene glycol di(meth)acrylate, 1,4-butylene glycol di(meth)acrylate, and polyoxytetraethylene glycol di(meth)acrylate. These (meth)acrylate monomers having at least one unsaturated double bond can be used singly or in admixture. An amount of the component (a) to be compounded is preferably 2 to 50% by weight in the resin composition for soft relining material. When the amount of the monomer to be compounded is less than 2% by weight, the swelling of the (meth)acrylate polymer or copolymer as the component (c) is insufficient, whereby the operability is deteriorated. On the other hand, when it exceeds 50% by weight, it is difficult to impart a proper elasticity (softness) after curing.

Examples of the aliphatic acid ester-based plasticizer as the component (b) include trimellitic acid esters, fatty acid esters, dicarboxylic acid esters, acetic acid esters, maleic acid esters, fumaric acid esters, and citric acid esters. Specifically, the trimellitic acid esters include tri-2-ethylhexyl trimellitate; the dicarboxylic acid esters include dimethyl adipate, diisobutyl adipate, dibutyl adipate, diisobornyl adipate, di-2-ethylhexyl adipate, diisodecyl adipate, diethyl diglycol adipate, dibutyl diglycol adipate, di-2-ethylhexyl azelate, dimethyl sebacate, dibutyl sebacate di-2-ethylhexyl sebacate, the fatty acid esters include methylacetyl ricinolate, and epoxidized soybean oil; the acetic acid esters include glyceryl triacetate and 2-ethylhexyl acetate; the maleic acid esters include diethyl maleate, dibutyl maleate, and di-2-ethylhexyl maleate; the fumaric acid esters include dibutyl fumarate and di-2-ethylhexyl fumarate; and the citric acid esters include trimethyl citrate, triethyl citrate, tripropyl citrate, tributyl citrate, triisopropyl citrate, and triisobutyl citrate. Of these aliphatic acid ester-based plasticizers as the component (b), are preferred diisobutyl adipate, diisobornyl adipate, dibutyl sebacate, and tributyl citrate. These aliphatic acid ester-based plasticizers as the component (b) can be used singly or in admixture and are a safety plasticizer that may not possibly act as an endocrine disruptor to living bodies.

In the resin composition for soft relining material according to the present invention, it is preferred that an amount of the acid ester-based plasticizer as the component (b) to be compounded is 20 to 80% by weight in the resin composition for soft relining material. When the amount of the acid ester-based plasticizer as the component (b) to be compounded is less than 20% by weight, a sufficient softness is not imparted after the polymerization. On the other hand, when it exceeds 80% by weight, the resin composition for soft relining material tends to become excessively soft. Further, since the acid ester-based plasticizer as the component (b), which is used for the resin composition for soft relining material according to the present invention, functions to properly swell the (meth)acrylate polymer or copolymer as the component (c), it has such a characteristic that the resulting resin composition for soft relining material is hardly sticky during the use. Accordingly, there is an advantage that a proper operability can be obtained even without addition of a liquid paraffin, etc. as an anti-sticky agent as in the conventional art resin compositions for soft relining material.

The (meth)acrylate polymer or copolymer as the component (c) is swollen by the (meth)acrylate monomer as the component (a), the acid ester-based plasticizer as the component (b), and ethyl alcohol as the component (e), which is compounded, if desired, thereby forming a basic matrix portion of a resin material for soft relining material.

As the (meth)acrylate polymer or copolymer as the component (c), are usable general polymers that have hitherto been used in the dentistry. Specific examples include homopolymers or copolymers of methyl (meth)acrylate, ethyl (meth)acrylate, t-butyl (meth)acrylate, n-butyl (meth)acrylate, lauryl (meth)acrylate, dodecyl (meth)acrylate, stearyl (meth)acrylate, cyclohexyl (meth)acrylate, benzyl (meth)acrylate, isobonyl (meth)acrylate, isopropyl (meth)acrylate, 2-hydroxyethyl (meth)acrylate, 3-hydroxypropyl (meth)acrylate, 2-hydroxy-1,3-dimethacryloxypropane, isobutyl (meth)acrylate, butoxyethyl (meth)acrylate, hydroxypropyl (meth)acrylate, tetrahydrofurfuryl (meth)acrylate, glycidyl (meth)acrylate, 2-methoxyethyl (meth)acrylate, 2-ethylhexyl (meth)acrylate, and benzyl (meth)acrylate; and (meth)acrylate/styrene copolymers.

These polymers can be used singly or in admixture. Of these polymers or copolymers, are preferred (meth)acrylate homopolymers, methacrylate/acrylate copolymers, and (meth)acrylate/styrene copolymers.

A suitable molecular weight of such polymer is in the range of 100,000 to 1,500,000. When the molecular weight of the polymer is less than 100,000, the composition in a dough-like state with the polymer being swollen tends to be too soft. On the other hand, when it exceeds 1,500,000, the composition in a dough-like state with the polymer being swollen tends to be too hard. Further, a suitable mean particle size of the polymer is in the range of 2 to 150 $\mu$m. When the mean particle size of the polymer is smaller than 2 $\mu$m, the swelling rate is too high, whereby the operation time tends to be too short. On the other hand, when it exceeds 150 $\mu$m, the fitness of the denture base to an oral mucosa tends to become worse.

As the polymerization initiator as the component (d), are usable any of a heat polymerization initiator, an autopolymerization initiator, and a photopolymerization initiator, which have hitherto been used.

As the heat polymerization initiator, are mainly used organic peroxides, azo compounds, and the like. As the organic peroxides, are preferred diacyl peroxides having an aromatic ring and peroxy esters considered to be esters of perbenzoic acid. Effective examples include benzoyl peroxide, 2,4-dichlorobenzoyl peroxide, m-tolyl peroxide, t-butyl peroxybenzoate, di-t-butyl peroxyisophthalate, and 2,5-dimethyl-2,5-di(benzoyl peroxy)hexane. As the azo compounds, is useful azobisisobutyronitrile. In addition, organometallic compounds such as tributylboron can be used.

As the autopolymerization initiator, are enumerated combinations of an organic peroxide with an aromatic tertiary amine. When such catalyst is used, the composition is compounded individually with the organic peroxide and with the aromatic tertiary amine, and they are mixed during the use of the resin composition for soft relining material. As the organic peroxide, are useful the same organic peroxides used for the heat polymerization type as described above. As the aromatic tertiary amine, are preferred tertiary amines in which a nitrogen atom is substituted directly on the aromatic group. Effective examples include N,N-dimethyl-p-toluidine, N,N-dimethylaminoethyl methacrylate, N,N-dimethylaniline, N-methyl-N-β-hydroxyaniline, N,N-di(β- hydroxyethyl)-aniline, N,N-di(β-hydroxyethyl)-p-toluidine, N,N-di(β-hydroxypropyl)-aniline, N,N-di(β-hydroxypropyl)-p-toluidine, triethanol-amine, ethyl 4-dimethylaminobenzoate, methyl N,N-dimethylaminobenzoate, ethyl N,N-dimethylaminobenzoate, and isoamyl N,N-dimethylaminobenzoate.

As the autopolymerization initiator, the following substances can be used in addition to those described above. Examples include combinations of a pyrimidinetrione derivative, an organometallic compound, and an organohalogen compound. These are used in such a manner that one component is compounded with the pyrimidinetrione derivative and the organometallic compound, while another component is compounded with the organohalogen compound. As the pyrimidinetrione derivative, are preferred 1-cyclohexyl-5-ethylpyrimidinetrione, 1-benzyl-5-phenylpyrimidinetrione, 5-butylpyrimidinetrione, 5-phenylpyrimidinetrione, 1,3-dimethylpyrimidinetrione, and 5-ethylpyrimidinetrione.

As the organometallic compound, are preferred acetylacetone copper, 4-cyclohexyl butyric copper, cupric acetate, copper oleate, acetylacetone manganese, manganese naphthenate, manganese caprylate, acetylacetone cobalt, cobalt naphthenate, acetylacetone lithium, lithium acetate, acetylacetone zinc, zinc naphthenate, acetylacetone nickel, nickel acetate, acetylacetone aluminum, acetylacetone calcium, acetylacetone chromium, acetylacetone iron, sodium naphthenate, and rare earth octoate.

As the organohalogen compound, are preferred dilauryl dimethylammonium chloride, lauryl dimethylammonium chloride, tetra-n-butylammonium chloride, trioctyl methylammonium chloride, benzyldimethyl cetylammonium chloride, and benzyldimethyl stearylammonium chloride.

As the photopolymerization initiator, is usually used a combination of a sensitizer with a reducing agent. Those sensitizer and reducing agent can be mixed into one component or separately in different components. Examples of the sensitizer include camphorquinone, benzil, diacetyl, benzyl dimethyl ketal, benzyl diethyl ketal, benzyl di(2-methoxyethyl) ketal, 4,4'-dimethybenzyl dimethyl ketal, anthraquinone, 1-chloroanthraquinone, 2-chloroanthraquinone, 1,2-benzanthraquinone, 1-hydroxyanthraquinone, 1-methylanthraquinone, 2-ethylanthraquinone, 1-bromoanthraquinone, thioxanthone, 2-isopropylthioxanthone, 2-nitrothioxanthone, 2-methylthioxanthone, 2,4-dimethylthioxanthone, 2,4-diethylthioxanthone, 2,4-diisopropyl-thioxanthone, 2-chloro-7-trifluoromethyl-thioxanthone, thioxanthone-10,10-dioxide, thioxanthone-10-oxide, benzoin methyl ether, benzoin ethyl ether, isopropyl ether, benzoin isobutyl ether, benzophenone, bis(4-dimethylaminophenyl) ketone, 4,4'-bisdiethylaminobenzophenone, acyl phosphine oxide derivatives, and azide group-containing compounds. These sensitizers can be used singly or in admixture. As the reducing agent, are generally used the tertiary amines described above.

In the resin composition for soft relining material using a photopolymerization initiator, the polymerization reaction is achieved upon irradiation with rays such as ultraviolet rays and visible rays. As a light source, are usable various super-high, high, medium and low pressure mercury vapor lamps, chemical lamps, carbon arc lamps, metal halide lamps, fluorescent lamps, tungsten lamps, xenon lamps, and argon ion lasers.

An amount of the polymerization initiator as the component (d) to be compounded is preferably 0.005 to 5 parts by weight based on 100 parts by weight of the whole of the composition. When the amount of the polymerization initiator to be compounded is less than 0.005 parts by weight, a sufficient effect cannot be obtained. On the other hand, even when it exceeds 5 parts by weight, the effect tends to not particularly increase.

In order to obtain a resin composition for soft relining material that is softer, such as a mucosal conditioner, by swelling sufficiently the (meth)acrylate polymer or copolymer as the component (c), the resin composition for soft relining material according to the present invention may further contain 1 to 15% by weight of ethyl alcohol as the component (e). When the amount of ethyl alcohol as the component (e) is less than 1% by weight, no effect by the compounding is obtained. On the other hand, when it exceeds 15% by weight, the stability of the composition becomes worse.

Similar to the soft relining material, the resin composition for soft relining material according to the present invention can be used in various types such as a powder-liquid type, which comprises a liquid component containing the (meth)acrylate having at least one unsaturated double bond as the component (a) and the acid ester-based plasticizer as the component (b) as major components, and optionally, ethyl alcohol as the component (e) and a powder component containing the (meth)acrylate polymer or copolymer as the component (c); a liquid or pasty type, comprising, as major components, the (meth)acrylate having at least one unsaturated double bond as the component (a), the acid ester-based plasticizer as the component (b), and the (meth)acrylate polymer or copolymer as the component (c) as a major component, and optionally, ethyl alcohol as the component (e); and a composite type of the above-described powder-liquid type and liquid type (or pasty type). In any of these types, the resin composition for soft relining material according to the present invention contains the polymerization initiator as the component (d) in an amount of 0.005 to 5 parts by weight based on 100 parts by weight of the whole of the composition. The compounding manner of the photopolymerization initiator as the component (d) varies depending upon its kind, as described above.

In addition, as a matter of course, so far as the characteristics of the resin composition for soft relining material according to the present invention are not deteriorated, various additives as used in the general dental resin materials, such as polymerization inhibitors, coloring agents, ultraviolet light absorbers, perfumes or flavors, and fungicides, can be used.

The invention will be described below in more detail with reference to the following Examples, but it should not be construed that the invention is limited thereto.

(Depth of Needle Penetration and Ratio of Depth of Needle Penetration)

According to the procedures pursuant to the test as defined in JIS T6519 titled with "Short-term Lining Materials for Removable Dentures," the depth of needle penetration and the ratio of depth of needle penetration were evaluated. The results obtained 120 minutes after mixing (after completion of irradiation with light, in the case of including a photopolymerization initiator) and those obtained 7 days after mixing are summarized and shown in Table 1.

EXAMPLE 1

(Powder Component)
(c) Ethyl methacrylate polymer 100% by weight
(d) 1-Cyclohexyl-5-ethylpyrimidinetrione 1 part by weight based on 100 parts by weight of the above-described polymer
(d) Acetylacetone copper 0.001 part by weight based on 100 parts by weight of the above-described polymer (Liquid Component)
(a) Methyl methacrylate 10% by weight
(b) Tributyl citrate 75% by weight
(e) Ethyl alcohol 15% by weight
(d) Dilauryl dimethylammonium chloride 0.25 parts by weight based on 100 parts by weight of the total sum of the above-described liquid components The respective components were weighed, and mixed with each other to prepare a resin composition for soft relining material. The liquid component and the powder component were mixed in a proportion of powder to liquid of 2.2 g/1.8 g, and measured for the depth of needle penetration by the method as described above. Further, for the purpose of evaluating a change of softness with a lapse of time, was calculated a ratio of the depth of needle penetration that is a value obtained by dividing the value of the depth of needle penetration 120 minutes after mixing by the value of the depth of needle penetration 7 days after mixing.

When this resin composition for soft relining material was used as a mucosal conditioner, a cured material exhibited a proper softness and was good in fitness of the denture base to an oral mucosa.

EXAMPLE 2

(Powder Component)
(c) Ethyl methacrylate polymer 100% by weight
(d) Benzoyl peroxide 0.8 parts by weight based on 100 parts by weight of the above-described polymer (Liquid Component)
(a) t-Butyl methacrylate 5% by weight
(a) Methyl methacrylate 5% by weight
(b) Dibutyl sebacate 80% by weight
(e) Ethyl alcohol 10% by weight
(d) N,N-Di(β-hydroxyethyl)-p-toluidine 1.75 parts by weight based on 100 parts by weight of the total sum of the above-described liquid components The respective components were weighed, and mixed with each other to prepare a resin composition for soft relining material. The liquid component and the powder component were mixed in a proportion of powder to liquid of 2.2 g/1.8 g, and measured for the depth of needle penetration and obtained for the ratio of the depth of needle penetration in the same manner as in Example 1.

When this resin composition for soft relining material was used as a mucosal conditioner, a cured material exhibited a proper softness and was good in fitness of the denture base to an oral mucosa.

EXAMPLE 3

(Powder Component)
(c) Methyl methacrylate/ethyl methacrylate copolymer (3:7): 100% by weight
(d) 1-Cyclohexyl-5-ethylpyrimidinetrione 1 part by weight based on 100 parts by weight of the above-described polymer
(d) Acetylacetone copper 0.001 part by weight based on 100 parts by weight of the above-described polymer (Liquid Component)
(a) Butoxyethyl methacrylate 20% by weight
(b) Diisobutyl adipate 80% by weight
(d) Dilauryl dimethylammonium chloride 0.25 parts by weight based on 100 parts by weight of the total sum of the above-described liquid components The respective components were weighed, and mixed with each other to prepare a resin composition for soft relining material. The liquid component and the powder component were mixed in a proportion of powder to liquid of 2.2 g/1.8 g, and measured for the depth of needle penetration and obtained for the ratio of the depth of needle penetration in the same manner as in Example 1.

When this resin composition for soft relining material was used as a relining material, a cured material exhibited a proper softness and was good in fitness of the denture base to an oral mucosa.

EXAMPLE 4

(Powder Component)
(c) Methacrylate/styrene copolymer 100% by weight
(d) Benzoyl peroxide 1.0 part by weight based on 100 parts by weight of the above-described polymer (Liquid Component)
(a) 2-Methoxyethyl methacrylate 10% by weight
(b) Dibutyl sebacate 50% by weight
(b) Tributyl citrate 30% by weight
(e) Ethyl alcohol 10% by weight The respective components were weighed, and mixed with each other to prepare a resin composition for soft relining material. The liquid component and the powder component were mixed in a proportion of powder to liquid of 2.2 g/1.8 g, and measured for the depth of needle penetration and obtained for the ratio of the depth of needle penetration in the same manner as in Example 1.

When this resin composition for soft relining material was used as a mucosal conditioner, a cured material exhibited a proper softness and was good in fitness of the denture base to an oral mucosa.

EXAMPLE 5

(Powder Component)
(c) Ethyl methacrylate polymer 100% by weight (Liquid Component)
(a) Butoxyethyl methacrylate 15% by weight
(b) Diisobutyl adipate 80% by weight
(e) Ethyl alcohol 5% by weight
(d) Camphorquinone 0.5 parts by weight based on 100 parts by weight of the total sum of the above-described liquid components.
(d) Ethyl 4-dimethylaminobenzoate 1.5 parts by weight based on 100 parts by weight of the total sum of the above-described liquid components The respective components were weighed, and mixed with each other to prepare a resin composition for soft relining material. The liquid component and the powder component were mixed in a proportion of powder to liquid of 2.2 g/1.8 g, and irradiated with light for 20 seconds by means of a commercially available visible light irradiator (a trade name LABOLIGHT LV-II, manufactured by GC Corporation) Then, the depth of needle penetration was measured, and the ratio of the depth of needle penetration was obtained in the same manner as in Example 1.

When this resin composition for soft relining material was used as a mucosal conditioner, a cured material exhibited a proper softness and was good in fitness of the denture base to an oral mucosa.

EXAMPLE 6

(a) Butoxyethyl methacrylate 16% by weight
(a) Methyl methacrylate 15% by weight
(b) Diisobutyl adipate 34% by weight
(c) Ethyl methacrylate polymer 35% by weight
(d) Camphorquinone 0.5 parts by weight based on 100 parts by weight of the total sum of the above-described liquid components
(d) Ethyl 4-dimethylaminobenzoate 1.5 parts by weight based on 100 parts by weight of the total sum of the above-described liquid components.

The respective components were weighed, and mixed with each other to prepare a one-liquid type resin composition for soft relining material. This one-liquid type resin composition for soft relining material was irradiated with light in the same manner as in Example 5, and measured for the depth of needle penetration and obtained for the ratio of the depth of needle penetration in the same manner as in Example 1.

When this resin composition for soft relining material was used as a relining material, a cured material exhibited a proper softness and was good in fitness of the denture base to an oral mucosa.

EXAMPLE 7

(Liquid A)
(a) 1,6-Hexanediol dimethacrylate 5% by weight
(b) Tributyl citrate 75% by weight
(c) Methyl methacrylate/ethyl methacrylate copolymer (5:5): 20% by weight
(d) Benzoyl peroxide 0.15 parts by weight based on 100 parts by weight of the above-described liquids components (Liquid B)
(a) Polyoxytetraethylene glycol dimethacrylate 70% by weight
(c) Methyl methacrylate/ethyl methacrylate copolymer (5:5): 30% by weight
(d) N,N-Dimethyl-p-toluidine 0.3 parts by weight based on 100 parts by weight of the total sum of the above-described liquid components The respective components were weighed, and mixed with each other to prepare a two-paste type resin composition for soft relining material. Then, the depth of needle penetration was measured, and the ratio of the depth of needle penetration was obtained in the same manner as in Example 1, except that a mixing ratio of the paste A to the paste B was 4:7 (by weight).

When this resin composition for soft relining material was used as a relining material, a cured material exhibited a proper softness and was good in fitness of the denture base to an oral mucosa.

EXAMPLE 8

(Liquid A)
(a) 1,6-Hexanediol dimethacrylate 5% by weight
(b) Tributyl citrate 75% by weight
(c) Methyl methacrylate/ethyl methacrylate copolymer (5:5): 20% by weight
(d) Camphorquinone: 0.5 parts by weight based on 100 parts by weight of the total sum of the above-described liquid components.
(d) Ethyl 4-dimethylaminobenzoate 1.5 parts by weight based on 100 parts by weight of the total sum of the above-described liquid components (Liquid B)
(a) Polyoxytetraethylene glycol dimethacrylate 70% by weight
(c) Methyl methacrylate/ethyl methacrylate copolymer (5:5): 30% by weight The respective components were weighed, and mixed with each other to prepare a two-paste type resin composition for soft relining material. Then, the depth of needle penetration was measured, and the ratio of the depth of needle penetration was obtained in the same manner as in Example 1, except that a mixing ratio of the paste A to the paste B was 1:2 (by weight).

When this resin composition for soft relining material was used as a relining material, a cured material exhibited a proper softness and was good in fitness of the denture base to an oral mucosa.

Comparative Examples 1

Using a commercially available mucosal conditioner (a trade name GC SOFT-LINER, made by GC Corporation) as the conventional art resin composition for soft relining material, a liquid and a powder were weighed and mixed with each other according to the instructions in the specification. Then, the depth of needle penetration was measured, and the ratio of the depth of needle penetration was obtained in the same manner as in Example 1.

TABLE 1

| | Depth of needle penetration | | |
|---|---|---|---|
| | 120 minutes after irradiation with light or mixing A (mm) | 7 days after irradiation with light or mixing B (mm) | Ratio of depth of needle penetration A/B |
| Example 1 | 0.63 | 0.60 | 1.05 |
| Example 2 | 0.60 | 0.56 | 1.07 |
| Example 3 | 0.51 | 0.47 | 1.09 |
| Example 4 | 0.60 | 0.57 | 1.05 |
| Example 5 | 0.64 | 0.61 | 1.05 |
| Example 6 | 0.50 | 0.48 | 1.04 |
| Example 7 | 0.53 | 0.50 | 1.06 |
| Example 8 | 0.52 | 0.50 | 1.04 |
| Comparative Example 1 | 0.53 | 0.30 | 1.77 |

As is clear from Table 1, the resin composition for soft relining material according to the present invention has a value of the depth of needle penetration showing the softness after curing, at the same level as in the conventional art mucosal conditioner. Thus, it can be confirmed that it is possible to obtain a soft resin material for denture base having a softness at the same level as in those of the conventional art, without using a phthalate-based plasticizer. Further, from the facts that the values of the depth of needle penetration 7 days after the irradiation with light or mixing is low in change from the initial values and that the ratios of the depth of needle penetration are small, it can be confirmed that the soft resin composition for denture base according to the present invention is low in change of the softness with a lapse of time, as compared with the conventional art resin material for soft relining material.

In the light of the above, the resin composition for soft relining material according to the present invention can meet the performances required in a soft relining, such as a proper softness and fitness between a denture base and an oral mucosa, without using a phthalate-based plasticizer widely used in the conventional art resin composition for soft relining material, which is pointed out to have a possibility for influencing living bodies as an endocrine disruptor.

Further, by polymerizing the (meth)acrylate monomer having at least one unsaturated double bond, the elution of the acid ester-based plasticizer and ethyl alcohol can be prevented. Thus, the resin composition for soft relining material according to the present invention is superior in stability of physical natures over a long period of time. Accordingly, the present invention is extremely valuable in contributing to the dental remedy.

While the invention has been described in detail and with reference to specific embodiments thereof, it will be apparent to one skilled in the art that various changes and modifications can be made therein without departing from the spirit and scope thereof.

What is claimed is:

1. A resin composition for soft relining material, comprising:

2 to 50% by weight of (a) a (meth)acrylate monomer having at least one unsaturated double bond;

20 to 80% by weight of (b) a plasticizer selected from the group consisting of diisobutyl adipate, diisobornyl adipate, dibutyl sebacate and tributyl citrate;

10 to 70% by weight of (c) a (meth)acrylate polymer or copolymer; and 0.005 to 5 parts by weight, based on 100 parts by weight of the total sum of the components (a), (b) and (c), of a polymerization initiator (d).

2. The resin composition for soft relining material as claimed in claim 1 further comprising 1 to 15% by weight of an ethyl alcohol (e).

3. The resin composition for soft relining material as claimed in claim 2, wherein the polymerization initiator (d) is a heat polymerization initiator.

4. The resin composition for soft relining material as claimed in claim 2, wherein the polymerization initiator (d) is an autopolymerization initiator.

5. The resin composition for soft relining material as claimed in claim 2, wherein the polymerization initiator (d) is a photopolymerization initiator.

* * * * *